United States Patent

[11] 3,530,847

| [72] | Inventors | George W. Myler<br>Emmaus;<br>Domenick Saponara, Allentown,<br>Pennsylvania |
|---|---|---|
| [21] | Appl. No. | 718,129 |
| [22] | Filed | April 2, 1968 |
| [45] | Patented | Sept. 29, 1970 |
| [73] | Assignee | Caloric Corporation<br>Topton, Pennsylvania<br>a corporation of Pennsylvania |

[54] GAS-FUELED SELF-CLEANING OVEN
13 Claims, 2 Drawing Figs.

| [52] | U.S. Cl. | 126/21 |
| [51] | Int. Cl. | F21c 15/32 |
| [50] | Field of Search | 126/21,<br>273, 39, 19 |

[56] References Cited
UNITED STATES PATENTS

| 3,459,170 | 8/1969 | Fromm | 126/21 |
| 3,417,742 | 12/1968 | Perl | 126/21 |
| 3,423,568 | 1/1969 | Meckley et al. | 126/21X |
| 3,121,158 | 2/1964 | Hurko | 126/273X |
| 3,312,271 | 4/1967 | Beach et al. | 126/273X |
| 3,364,912 | 1/1968 | Dills et al. | 126/21 |
| 3,376,862 | 4/1968 | Riehl | 126/273X |

*Primary Examiner*—Edward G. Favors
*Attorney*—Harold A. Murphy

ABSTRACT: A self-cleaning oven for household gas ranges comprising an oven containing a lower convection heater and an upper radiant heater for heating the interior of the oven to a temperature high enough for pyrolysis of food soils on the oven walls, the oven having an exhaust opening near an upper extremity thereof for exhaust of resulting gaseous degradation products, the radiant heater providing a broad flame of extensive area positioned to intercept the flow of degradation products before the products reach the exhaust opening whereby smoke in the degradation products is substantially removed by incineration.

INVENTORS
GEORGE W. MYLER
DOMENICK SAPONARA
BY H. Humphry
AGENT

INVENTORS
GEORGE W. MYLER
DOMENICK SAPONARA

GAS-FUELED SELF-CLEANING OVEN

BACKGROUND OF THE INVENTION

This invention relates generally to self-cleaning ovens and has particular reference to self-cleaning ovens for household gas ranges. Self-cleaning gas ovens have become developed subsequent to the development of electrical self-cleaning ovens, and present many problems which are not encountered with electrical ovens.

In known electrical ovens such as, for example, the oven shown and described in U.S. Pat. No. 3,121,158, there are provided upper and lower radiant heating elements which are simultaneously operable to raise the temperature of the oven interior to a high enough level which will cause pyrolytic action to occur in food soils accumulated on the walls of the oven cavity. Such pyrolytic action, which occurs at various temperatures above about 750°F., depending upon the constituents of the food soils, causes conversion of the soils into corresponding gaseous degradation products, which degradation products are exhausted to the exterior of the oven as they are produced so as to prevent any subsequent substantial condensation thereof upon the interior surfaces of the oven cavity.

Such degradation products include smoke, carbon monoxide and other objectionable constituents which must be eliminated before the gaseous degradation products are allowed to be exhausted into a kitchen atmosphere. This has been achieved by the incorporation in the exhaust flue of a catalytic unit which promotes the oxidation of carbon and carbon compounds and thus eliminates the objectionable constituents which come into contact with it during the exhaust process.

In an electric self-cleaning oven it is also desirable to employ a third heating element adjacent the oven door for aiding in maintaining the elevated temperature within the oven. It is also desirable and necessary to prevent the escape of heat from the oven during a self-cleaning cycle since excess amounts of escaping heat will raise the temperature of the outer walls of the range and of surrounding wall surfaces of the room above the danger level. Therefore, U.S. Pat. No. 3,121,158 teaches a structure wherein a specified range wall structure is disclosed and a maximum self-cleaning temperature of about 950°F. is employed so that the outer wall of the range will not reach a temperature above 194°F. during a time cycle in excess of 2 hours.

Attempts have been made to construct gas-fueled self-cleaning ovens with a plurality of jet-type and radiant-type burners located in various areas of the oven including the side walls. However, several problems have been encountered in such gas ovens. For example, in some structures the locations of the burners were not suitable for proper cooking performance of the oven when the heating elements were separately used for broiling and baking. In some structures embodying three heating elements, for example, the control system became unduly complicated and expensive. Other problems relating to burner ignition, flame monitoring, and safety were encountered when three radiant burners were visibly exposed in a single oven-broiler compartment or cavity.

Another consideration in the development of a self-cleaning gas oven is the ability to go from room ambient temperature up to above 1,000°F. in the shortest possible time. Obviously, this can be done with very large B.t.u. input burners. However, these large B.t.u. input burners are not practical for conventional use separately as a broiler element and a baking element.

A still further problem in gas ovens of this character was the reaction or operation of an upper burner in a contaminated oven atmosphere; that is, how will the upper burner burn in a compartment that is contaminated with combustion products from the lower oven burner. In a contaminated oven atmosphere, air necessary for combustion in the upper burner is lacking.

SUMMARY OF THE INVENTION

The present invention relates to a gas-fueled self-cleaning oven which solves the foregoing problems concerned with known gas ovens of this nature and which improves in many respects upon known electric self-cleaning ovens. In the present invention there are employed two separate burners, an upper radiant-type burner within the oven cavity and supported adjacent the under side of the top wall thereof, and a lower blue-flame, ported-type burner located beneath the bottom wall of the oven for heating the oven by convection.

The burners are tailored to perform their separate broil and bake operations and also to be used simultaneously to achieve pyrolytic temperatures within an oven. In addition to the very fast heating up capabilities of these two burners operating at the same time, there is provided infra-red radiation from the radiant broiler burner directly on the surface of the food soil to be removed from the interior surfaces of the oven walls, simultaneously with the provision to the food soil of heat by convection throughout the oven compartment from the ported burner beneath the bottom wall of the oven. The double effect of absorption by the food soil of heat from the upper radiant burner plus convected heat from the lower blue-flame burner provides for excellent and rapid pyrolysis.

It was found that an upper radiant burner can be made to efficiently operate in an oven contaminated with combustion products by locating the primary air inlet of the upper burner outside the contaminated atmosphere of the oven compartment.

Further, in accordance with this invention, it has been found that the upper radiant burner will solve the problem of removing from the gaseous degradation products being exhausted substantially all the smoke, carbon monoxide, etc., which would otherwise be exhausted into the kitchen atmosphere. These degradation products pass upwardly and out of the oven through an exhaust vent and normally would include smoke, carbon monoxide, etc. However, the radiant burner provides a broad sheet of flame which extends transversely over a substantial area of the oven compartment so that substantially all of the degradation products flowing toward the exhaust port will pass through or over the flame whereupon the smoke and carbon constituents in the products will be consumed by the flame; that is, they will be incinerated and thus will pass out of the oven as a substantially clear, odorless, invisible and completely harmless product.

BRIEF DESCRIPTION OF THE DRAWINGS

The above and other objectives of this invention will become apparent from the following description taken in conjunction with the drawings, wherein.

DESCRIPTION OF THE PREFERRED EMBODIMENTS

Figure 1:
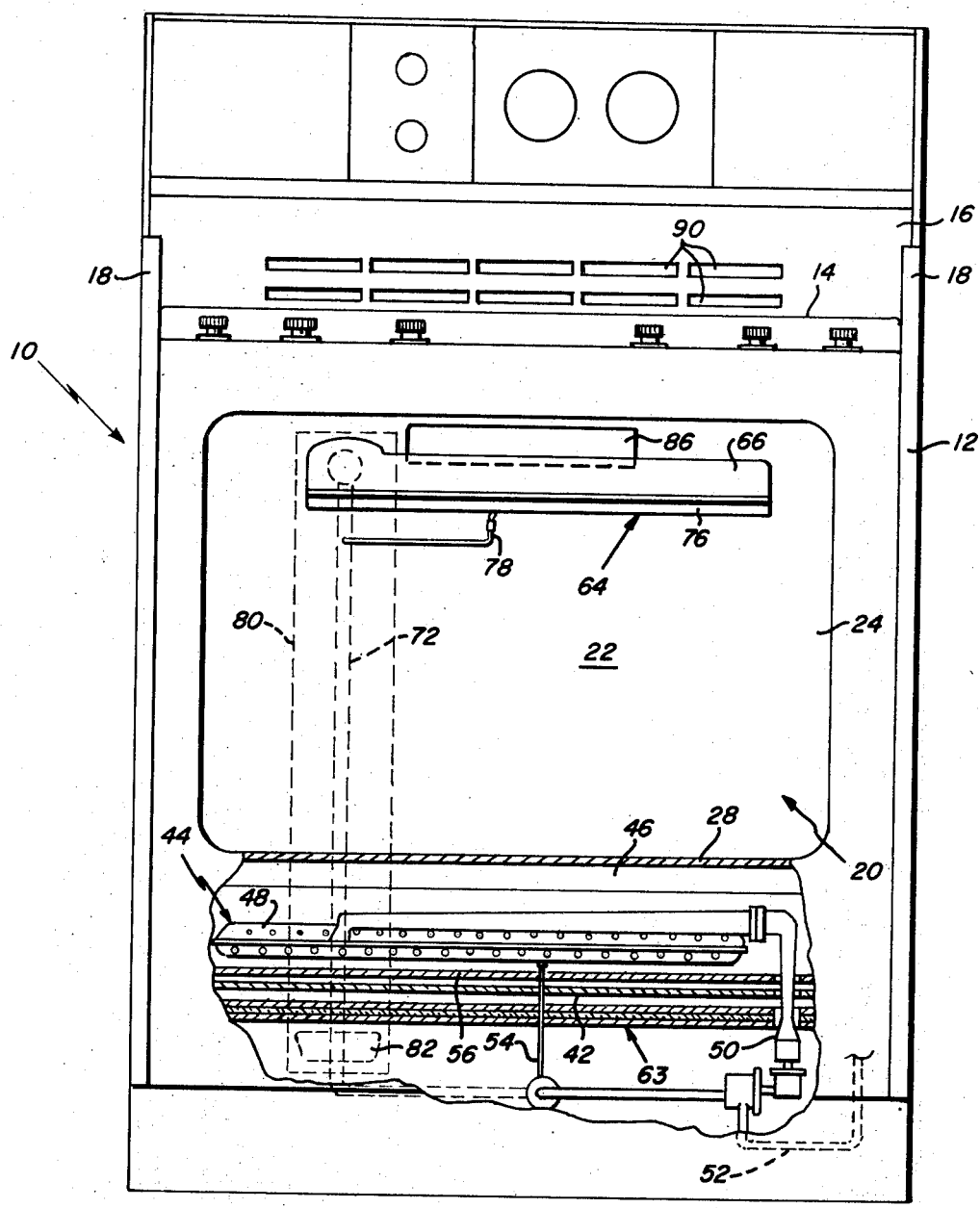
FIG. 1 is a front elevational view partly in section of a self-cleaning gas oven embodying a preferred form of the invention and showing the oven door removed.
Figure 2:
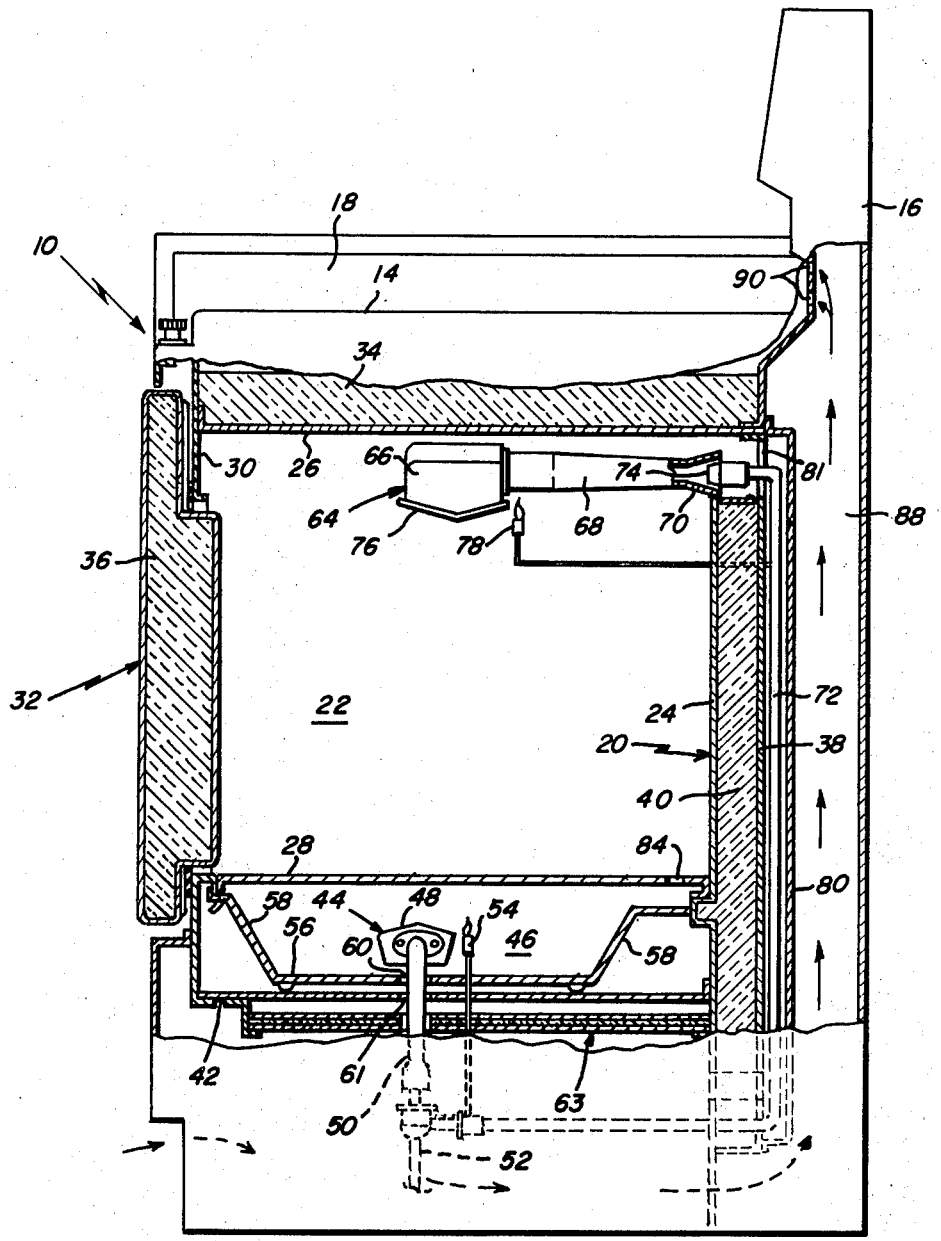
FIG. 2 is a side elevational view partly in section of the oven shown in FIG. 1, with the oven door shown in closed position.

Referring more particularly to the drawings wherein like characters of reference designate like parts throughout the views, the household gas range depicted in FIGS. 1 and 2 is shown without the top burners and gas supply connections thereto which do not in themselves constitute any part of this invention. Likewise, details of the controls for the top burners have also been omitted from the drawings, as well as details of the controls for the oven burners since such controls in themselves also constitute no part of the present invention.

More particularly, the range 10 comprises an upstanding substantially box-like metal body 12 carrying a substantially horizontal metal cooking top 14 and upstanding metal backsplash 16 and sidesplashes 18 arranged respectively at the back and sides of the cooking top 14.

Within the body 12 is a substantially box-shaped metal liner 20 which defines an oven cooking cavity 22 and comprises a rear wall 24, a top wall 26, a bottom wall 28, and a pair of side walls. The interior surfaces of the liner 20 may be finished in any conventional manner such as, for example, by carrying a layer of porcelain enamel of the glass-frit type, not shown. An opening is provided in the front of the range and through the liner front wall 30, whereby the interior of the oven cooking cavity 22 is accessible from the front of the body. A door 32 is mounted upon the front of the body 10 by a suitable hinge structure (not shown) whereby the door is pivotally movable into open or closed relation with respect to the open front of the cavity 22. The door, hinge, and latching structure are not shown and do not constitute in themselves part of the present invention.

The liner top wall 26 is spaced well below the cooking top 14 and heat-insulated therefrom by a bolt 34 of fibrous glass or other selected insulating material which is intended to aid in confining heat as much as possible to the interior of the cavity 22 during operation of the oven. The door 32 may be similarly filled with insulating material 36, and at the back of the range insulating rear wall or shield 38 is provided in spaced relation with the oven rear wall 24, and the space therebetween is also filled with insulation 40. Thus, the top, sides, rear and front of the oven are insulated from the adjacent portions of the range and from the exterior atmosphere. At the bottom of the range is a heat-reflecting shield or plate 42, provided for reflecting heat toward the oven 20 and thus serving to protect the floor beneath the range.

In accordance with this invention, there is provided a lower burner 44 which is located in the cavity 46 beneath the liner bottom wall 28 and above shield 42. Burner 44 extends a substantial distance across the width of the cavity 46 and is of a conventional blue-flame type which includes a ported burner head 48 having a gas-receiving chamber for receiving gaseous fuel from a venturi or the like 50, which is suitably mounted to receive gas from a supply line 52 and to admixture the gas with air in the conventional and well-known manner. A constantly burning pilot light 54 is suitably connected into the gas supply system and is located adjacent the burner head 44 so that jets of flame will be ignited at each of the ports in the head when the control system (not shown) is operated to allow gas to flow into the head.

The lower burner head 44 is enclosed within the cavity 46 on the bottom and sides by a heat-reflecting shield 56, the bottom of which is mounted above and spaced from shield 42 and which has side portions or wings 58 angled upwardly and outwardly to deflect heat toward the bottom wall 28 of the oven liner 20. Suitable vents 60 and 61 are, of course, provided in the shields 56 and 42 to insure that sufficient air enters the cavity 46 to sustain combustion. The deflectors 58 are provided with suitable direct connections to the oven side and back walls, as is the bottom wall 28, so that heat therein will be transmitted by convection to the oven wall surfaces. Beneath and spaced from shield 42 there is located another transversely extending heat-protecting composite shield or panel 63 which preferably comprises a multi-layer structure embodying a sheet of asbestos sandwiched between sheets of metal.

The burner head 48 is provided with longitudinally spaced ports so that upon operation of the control system (not shown), which may be located in a suitable control panel, a number of jets of blue flame will project outwardly from the respective ports in the normal manner of a burner of this type. The control system, which is not shown, may include suitable selector switches which may be manually set to indicate "off," "bake," "time-bake," "broil" and "clean," for example, and may be suitably connected to valve systems for controlling the flow of gas to the lower ported burner 44 and to the upper radiant burner to be described hereinafter. Switches may also be provided with temperature-indicating indicia whereby, for example, the maximum temperature at which the oven is to be maintained during a baking operation by the burner 44 may be set, which temperature may be, for example, "150," etc., which has reference to °F. The "broil" selection may be approximately 600°F., and the "clean" selection may be approximately 985°F., for example, as more fully explained hereinafter. The control system, of course, will include the required temperature sensors, thermostats, switches, timers, circuitry and other components as may be required to control the flow of gas into the burners in accordance with the required time and temperature to be maintained in the oven.

In the oven cavity at the upper extremity thereof is a radiant burner 64 of a type which produces a broad sheet of flame or incandescence. One example of a radiant burner of a type suitable for use in the self-clean oven of the present invention is that disclosed in U.S. Pat. No. 3,122,197. This burner comprises a device wherein gas is burned on the surface of a screen to heat the screen to incandescence. It has been found that in such a radiant burner the radiant energy emitted increases with the increase of the radiating area and that a flat or slightly curved or shallow V-shaped screen presents the smallest area included within a given perimeter; and further that the radiating screen surface may be increased without increasing the perimeter thereof by providing the screen with undulations. Such a radiant burner 64 includes a burner head 66 defining an open-sided cavity, and a mixing chamber such as a venturi 68 which has its inner end communicating with the burner cavity and the outer end 70 adapted to receive gas from pipe 72. The mixing chamber 68, for efficient and rapid combustion, is required to receive an ample supply of primary combustion air. For example, 10 parts of air to one part of gas is considered to be one satisfactory ratio in the case of natural gas. To insure an adequate supply of uncontaminated primary combustion air, the mixing chamber 68 is made in the nature of an oversized venturi and its outer end 70 is bell-shaped, as shown in FIG. 2. End 70 is considerably larger than and encircles the outlet 74 of pipe 72 so that the amount of combustion air entrained by the gas will be adequate.

The burner 64 also includes an assembly 76 of a number of screens, as described in the aforementioned U.S. Patent, which screens close the open side of the burner cavity, this being the lower surface or side when the burner 64 is positioned in the upper extremity of the oven cavity 22 as shown. It will be apparent that a radiant burner 64 may be made which will produce an extremely broad, substantially continuous flame or incandescence which covers a substantially large radiating area. For the purposes of this description and in the appended claims it will be understood that the term "broad flame" is intended to mean the area of screen incandescence which is actually the energy- or heat-radiating area. For purposes to be realized at a later point in this description, it should be clearly understood that such a broad flame appears as a substantially sheet-like area of luminescence which is substantially continuous; that is, it provides a flame which is sheetlike in nature and which has no apertures, openings or spaces through which substantial amounts of smoke can pass without being consumed by the flame.

The pipe 72 is connected to the supply line 52 and is also connected into the control system (not shown) so that, when the control system is operated to allow gas to flow from pipe 72 into mixing chamber 68, where it becomes mixed with air, and then into burner head 66, it will become ignited by a constantly burning flame of a pilot light 78. This creates a broad flame which radiates infra-red energy throughout the oven cavity.

It will be noted that primary air is provided for the radiant burner head 64 by means of a duct 80 which extends upwardly along rear wall 36 and terminates at its upper end at the opening 81 into which the end 70 of the mixing chamber extends. Since the lower end of the duct 80 terminates in the lower regions of the range, a constant supply of uncontaminated air is allowed to pass into the burner head 64. The lower end of duct 80 is shown as terminating at an opening 82 which communicates with the region of the range beneath the lower heat shield 42.

It will be understood, as pointed out before, that the burners 44 and 64 may be operated individually and separately from one another for conventional baking and broiling operations.

However, both burners are operated simultaneously for performing a self-cleaning operation, although one burner may be operated for a short time before the other at the start of a self-cleaning operation, and one or both burners may be intermittently operated or modulated during a self-cleaning cycle in order to maintain a required temperature level.

The presently described self-cleaning oven operates to quickly raise the temperature in the interior of the oven to approximately 1,040°F., for example, although this may vary slightly, and then the mean temperature levels off at about 985°F., for example. It has been found that self-cleaning occurs at a temperature which, for most cooking materials, is above about 750°F. It is known that with higher temperatures, shorter time periods are required for food soils to be removed by pyrolytic action. The upper temperature levels may be established in accordance with the particular design of the oven; that is, higher temperatures and shorter time cycles may be used if heavier insulation and fire protection are provided. However, it has been found that a leveling off temperature of about 985°F. can be maintained with a gas oven which is properly insulated without requiring complete redesign of the oven or the use of economically unreasonable amounts or types of insulation and that the temperatures of the outer walls of the range and of the surrounding walls and floor will not become undesirably heated. It is to be understood, therefore, that the temperature and time cycles set forth herein are exemplary only and may vary from range to range or with different oven and range constructions.

The presently described gas-fueled oven can be raised to a temperature of about from 1,000°–1,040°F. within about 25–35 minutes, for example. It reaches the self-cleaning temperature of 750°F. in about 10 minutes, then continues up to the 1,040°F. level in about an additional 10–15 minutes, finally leveling off at about 985°F. for about 55–65 minutes, at which time the oven has become completely cleaned. Then, the control system shuts off the flow of fuel to the burners, and the oven is allowed to cool. In about 15–20 minutes the oven temperature is low enough to permit the oven door to be opened. Thus, the presently described oven operates above about 750°F. to self-clean for about 70–80 minutes and performs almost its entire cleaning during a period of about 55–65 minutes when it is actually above a level of 950°F., although admittedly a slight amount of cleaning starts to occur when the oven is being initially raised from the 750°F. level to the 950°F. level, which process may take from about 10–15 minutes.

It has been discovered that the range of compounds of which food soils are composed may be decomposed or degraded by heat during the time interval of about 70–80 minutes when above about 750°F., which process will produce substantial amounts of gaseous degradation products.

In the heat-cleaning cycle, a sweep of ambient air proceeds upwardly through the oven cavity from beneath the heat shields 42 and 56, through openings 60 and 61 therein, through openings 84 (FIG. 2) in the side, front, or back edges of the oven bottom 28, and out through an exit or exhaust opening 86 (FIG. 1) into a flue or duct from which it flows out of the range through a series of openings 90 in the front of the backsplash 16. This flow of air carries with it the gaseous degradation products resulting from the pyrolysis of food soils during a self-cleaning cycle. However, some smoke or other visible form of these degradation results does occur, and for this reason the upper radiant burner 64 is located in a position to intercept substantially all of the air flow passing from the oven to the exhaust vent 86. In doing so, the smoke and other visible degradation products become incinerated by the broad flame, and, thus, the air flowing out through the vent 86 and openings 90 is substantially smokeless and clear.

The lower end of the flue 88 communicates directly with the fresh air supply beneath the lower burner shield 63. It will be apparent that a flow of fresh air will be constantly maintained because of the tendency of heated air to rise. Thus, the gaseous degradation products are satisfactorily removed from the interior of the oven without the necessity for additional appurtenances such as catalytic oxidizing units, etc.

From the foregoing, it will be apparent that all of the objectives of this invention have been achieved by the gaseous-fueled self-cleaning oven disclosed herein. It will be understood, however, that several modifications in the invention and its manner of use may be made by those skilled in the art without departing from the spirit of the invention as expressed in the accompanying claims.

We claim:

1. A gas-fueled self-cleaning oven comprising a substantially box-like metal liner provided with walls defining a cooking compartment and including a door in one of said walls, heating means for said compartment comprising a first gas-fueled heating element in the upper extremity of the compartment, a second gas-fueled heating element at the bottom of said compartment, said heating elements being operable independently for respective bake and broil operations and being operable simultaneously for self-cleaning operation, an exhaust vent in one of said walls, the first heating element being a broad flame element located adjacent said vent in a position to intercept the flow of degradation products passing from the oven outwardly through the vent during a self-cleaning operation, and means for supplying fuel to said heating elements.

2. A gas-fueled self-cleaning oven as set forth in claim 1 wherein said first heating element is a radiant infra-red generating means for radiantly directing heat throughout the cavity, and said second heating element is a ported blue-flame type heating means for producing a number of separate spaced flames.

3. A gas-fueled self-cleaning oven as set forth in claim 2 wherein said walls include a bottom, side and back walls, said bottom wall being connected to said back and side walls in a manner to conduct heat thereto by convection.

4. A gas-fueled self-cleaning oven as set forth in claim 1 wherein a second compartment encloses said second heating element, the cooking compartment having a bottom wall which is the top wall of the second compartment, and a heat shield beneath the second heating element for reflecting heat upwardly onto said bottom wall.

5. A gas-fueled self-cleaning oven as set forth in claim 4 wherein said heat shield has reflectors angled upwardly to reflect heat onto said bottom wall.

6. A gas-fueled self-cleaning oven as set forth in claim 4 wherein said second compartment has side walls directly connected with said heat shield and with said bottom wall whereby heat is transmitted therefrom by convection to said liner.

7. A gas-fueled self-cleaning oven as set forth in claim 1 wherein said first heating element is a radiant heat generating means for producing a broad area source of infra-red energy radiation extending across a substantial area of said compartment.

8. A gas-fueled self-cleaning oven as set forth in claim 7 wherein said broad area source of infra-red energy radiation comprises an area of substantially continuous gas-air combustion-excited incandescence.

9. A gas-fueled self-cleaning oven comprising a substantially box-like metal liner provided with walls and defining a cooking compartment, heating means for said compartment comprising a first gas-fueled heating element in the upper extremity of the compartment, a second gas-fueled heating element beneath said compartment, said heating elements being operable independently for respective bake and broil operations and being operable simultaneously for self-cleaning operation, an exhaust vent in one of said walls for exit of degradation products, the first heating element being a radiant burner located adjacent said vent in a position to intercept the flow of degradation products passing from the oven outwardly through the vent during a self-cleaning operation, and means for supplying fuel to said heating elements comprising a mixing chamber connected at one end to the first heating element and having its other end disposed in an atmosphere external to said compartment, a first gas supply pipe external of the compartment and terminating at the external end of the mixing chamber to supply gas thereto, and a second gas supply pipe connected to said second heating element.

10. A gas-fueled self-cleaning oven as set forth in claim 9 wherein a fresh air duct extends exteriorly of the liner and terminates at an aperture in the back wall of the liner, and the external end of the mixing chamber extends into the aperture whereby air from said duct may enter the mixing chamber.

11. A gas-fueled self-cleaning oven as set forth in claim 10 wherein the external end of the mixing chamber is bell-shaped and encircles the adjacent end of said first gas supply pipe in spaced relation therewith.

12. A gas-fueled self-cleaning oven comprising a substantially box-like metal inner liner provided with top, side, bottom and back walls and having an open front and defining a cooking compartment, a door closing said front opening, a second compartment beneath said cooking compartment and having side walls directly connected with said metal liner and a heat shield forming the bottom wall thereof directly connected with said side walls, heating means for said cooking compartment comprising a first gas-fueled heating element in the upper extremity thereof and a second gas-fueled heating element in said second compartment, said heating elements being operable independently for respective bake and broil operations and being operable simultaneously for self-cleaning operation, an exhaust vent in an upper portion of one of said walls of said cooking compartment, the first heating element being a radiant heat generating means for radiantly directing heat throughout the cooking compartment, said second heating element being a ported heating means for producing a number of separate spaced flames for heating primarily the bottom wall of the liner and, by convection, the cooking compartment, said first heating element comprising means for producing a broad area of infra-red energy radiation extending beneath a substantial area of said top wall of the liner, means for supplying fuel to said heating elements comprising a mixing chamber connected at one end to the first heating element and a first gas supply pipe external of the first compartment and terminating at the external end of the mixing chamber to supply gas thereto, and a second gas supply pipe connected to said second heating element, and a fresh air duct extending externally of the liner and terminating at an aperture in one wall of the liner, the external end of the mixing chamber being bell-shaped and extending into the aperture in encircling spaced relation with the adjacent end of said first gas supply pipe.

13. A gas-fueled self-cleaning oven comprising a substantially box-like metal liner provided with walls defining a cooking compartment and including a door in one of said walls, gas fueled means for internally heating the walls of said compartment to temperatures suitable for pyrolization of contaminants on the inner surfaces of said walls and comprising at least one gas-fueled heating element in the compartment, said at least one gas-fueled heating element being a radiant burner located in the upper extremity of the compartment, an exhaust vent in one of said walls, the radiant burner being located adjacent said vent in a position to intercept the flow of degradation products passing from the oven outwardly through the vent during a self-cleaning operation and control means connected to said heating means for maintaining within said compartment a temperature level of above 750°F. for a sufficient length of time to achieve self-cleaning of the walls of the oven by pyrolytic action.